No. 777,399. PATENTED DEC. 13, 1904.
I. CHURCH.
EXPANSION BOLT.
APPLICATION FILED APR. 6, 1903.
NO MODEL.
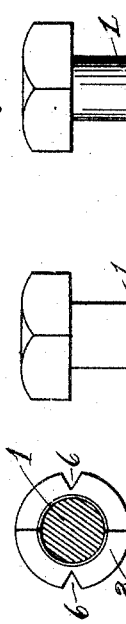
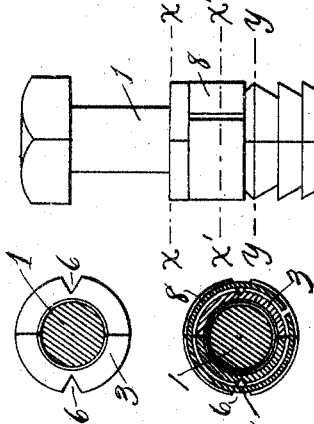
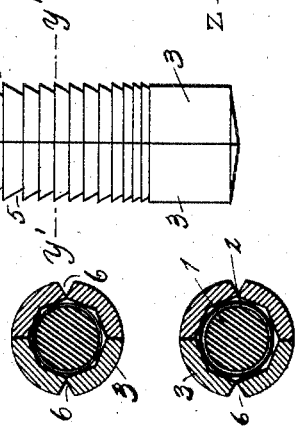
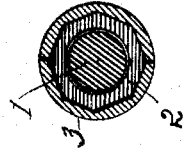
Witnesses:
David C. Walter
S. A. Dorland
Inventor:
Isaac Church,
By Anson Hall His Atty.

No. 777,399.

Patented December 13, 1904.

UNITED STATES PATENT OFFICE.

ISAAC CHURCH, OF TOLEDO, OHIO.

EXPANSION-BOLT.

SPECIFICATION forming part of Letters Patent No. 777,399, dated December 13, 1904.

Application filed April 6, 1903. Serial No. 151,242. (No model.)

*To all whom it may concern:*

Be it known that I, ISAAC CHURCH, a citizen of the United States, residing at Toledo, in the county of Lucas and State of Ohio, have invented certain new and useful Improvements in Expansion-Bolts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of bolts which is designed to secure various objects to stone and brick walls and for like purposes, being of the class known as "expansion-bolts."

My invention relates more particularly to an expansion-bolt consisting of a threaded bolt, a longitudinally-split sleeve therefor, the sleeve being of cylindrical contour externally with internally-tapered walls, and a nut on the bolt within the sleeve, the exterior of the nut being tapered to conform to the taper of the wall of the sleeve.

My invention also relates to a construction which affords an abutment for the inner end of the screw-bolt, which abutment receives the thrust of the bolt and prevents its longitudinal movement, thus compelling the travel of the nut within the shell or sleeve, and consequently the expansion of the sections of the sleeve.

My invention further relates to an arrangement of outside longitudinal grooves in the sleeve, which not only permits the sleeve to expand upon the weakened lines of the grooves, but also furnishes corners to engage the inner wall of the bolt-socket and to prevent the sleeve from turning axially.

The objects of my invention are to provide a cheap, simple, and effective construction which shall prevent the various parts of the device from becoming separated and lost, which shall provide for substantially a uniform expansion of the sleeve within its socket from one end to the other, which shall compel the longitudinal movement of the nut without a like movement of the threaded bolt, and which shall permit the withdrawal and insertion of the bolt without injuring or disturbing the sleeve or the nut. I attain these objects by means of the devices and arrangement of parts hereinafter described and shown, and illustrated in the accompanying drawings, in which—

Figure 1 is a side elevation of my device; Fig. 2, a like view showing the sleeve nut and ring, hereinafter referred to, in central longitudinal section; Fig. 3, a side elevation of one of the sleeve-sections, disclosing its interior; Fig. 4, a side elevation of the same sleeve-section seen from the opposite side; Fig. 5, a transverse section taken on line $x\ x$; Fig. 6, a like view on line $x'\ x'$; Fig. 7, a like view on line $y\ y$; Fig. 8, a like view on line $y'\ y'$; Fig. 9, a like view on line $z\ z$; Fig. 10, a side elevation of the tapered nut, hereinafter referred to, with a portion broken away to disclose its interior; and Fig. 11, a perspective view of the ring, hereinafter referred to, designed to retain the parts in assembled relation.

Like numerals of reference indicate like parts throughout the drawings.

In the drawings, 1 is a screw-threaded headed bolt, upon the threaded portion of which is a nut 2.

3 3 are sections of a sleeve substantially cylindrical on its exterior and having a tapered interior, as illustrated in Figs. 2 and 3. The nut 2 is tapered to correspond with the interior taper of the sleeve 3. In cross-section these tapered portions may be of any desired shape, either polygonal, oval, or of irregular form, the object being to prevent the nut from turning axially and to permit it to slide within the sleeve longitudinally. The chamber within the sleeve formed by the two segments of cylinders is closed at one end by a bridge or web 4, formed at the inner end of one or both of the sleeve-sections. The sleeve 3 on its exterior is corrugated or grooved circumferentially, as at 5, the sharp edges of the grooves being designed to engage the interior surface of the bolt-socket which receives the expansion-bolt. Since the interior of the sleeve is tapered, I prefer to make the circumferential grooves or corrugations of gradually-increasing depth in order to preserve the thickness of metal in the shells and to thus permit the uniform expansion of the bolt. On the outside of the sleeve-sections and longitudinally thereof are formed deep channels or grooves 6, forming lines upon which the shell-sections are bent and forced outwardly as the tapered nut is drawn powerfully along the tapered walls of the sleeve toward the head of the bolt. These longitudinal channels or grooves are also in depth proportioned to the thickness of the metal, being shallow at one end and of gradually-increasing depth toward the other end. Around the end of the sleeve near its outer end is an annular recess 7, adapted to receive an open ring 8, which clasps the sections of the sleeve together with the tapered nut between them, thus preventing the separation and loss of the parts and holding the parts in assembled relation ready for use.

The operation of my device is as follows: The sleeve is forced into a previously-prepared bolt-socket of proper depth and diameter. The bolt, with its end resting against the bridges or webs 4, is turned to draw the tapered nut outwardly, thus spreading and expanding the sleeve-sections and causing the corrugated surfaces to engage the walls of the socket. During this operation the sleeve is prevented from rotating axially by the sharp corners of the grooves 6. Now the bolt may be unscrewed and withdrawn without disturbing the sleeve or the nut, and the work to be supported by the bolt may be put in place and the bolt again inserted and the sleeve still further expanded and tightened up, if desired.

Having described my invention and its operation, what I claim, and desire to secure by Letters Patent, is—

1. In an expansion-bolt, a substantially cylindrical sleeve having a tapered bore enlarged at its inner end, and external circumferential corrugations varying in depth according to the transverse thickness of the walls of the sleeve.

2. In an expansion-bolt, a substantially cylindrical sleeve having a tapered bore enlarged at its inner end composed of segmental sections having deep external longitudinal grooves forming weakened lines which permit the sleeve to expand and which furnish corners to engage the inner wall of the bolt-socket to prevent the sleeve from turning axially, said grooves varying in depth with the thickness of the metal.

3. In an expansion-bolt, a substantially cylindrical sleeve having a tapered bore enlarged at its inner end and external circumferential corrugations varying in depth with the transverse thickness of the metal, having also outside longitudinal grooves varying in depth with the thickness of the metal, a threaded bolt in the sleeve, and a tapered nut on the bolt.

4. In an expansion-bolt, a substantially cylindrical sleeve having a tapered bore enlarged at its inner end and external circumferential corrugations varying in depth with the transverse thickness of the metal, having also outside longitudinal grooves varying in depth with the thickness of the metal, a threaded bolt in the shell, and a tapered nut on the bolt, combined with means for detachably securing said parts in assembled relation.

In testimony whereof I affix my signature in presence of two witnesses.

ISAAC CHURCH.

Witnesses:
    GEO. C. STAHL,
    S. A. DORLAND.